US012674863B2

(12) United States Patent
Wei et al.

(10) Patent No.: US 12,674,863 B2
(45) Date of Patent: Jul. 7, 2026

(54) RADAR SIGNAL INTERFERENCE MITIGATION WITH GENERATIVE NETWORKS

(71) Applicant: NXP B.V., Eindhoven (NL)

(72) Inventors: Xinyi Wei, Helmond (NL); Ruud van Sloun, Eindhoven (NL); Jihwan Youn, Eindhoven (NL); Jun Li, San Jose, CA (US); Satish Ravindran, Freemont, CA (US); Jeroen Overdevest, Eindhoven (NL)

(73) Assignee: NXP B.V., Eindhoven (NL)

( * ) Notice: Subject to any disclaimer, the term of this patent is extended or adjusted under 35 U.S.C. 154(b) by 250 days.

(21) Appl. No.: 18/243,062

(22) Filed: Sep. 6, 2023

(65) Prior Publication Data

US 2025/0076452 A1 Mar. 6, 2025

(51) Int. Cl.
G01S 7/02 (2006.01)
G01S 7/35 (2006.01)

(52) U.S. Cl.
CPC .............. G01S 7/023 (2013.01); G01S 7/354 (2013.01)

(58) Field of Classification Search
CPC .......... G01S 7/023; G01S 7/354; G01S 7/356; G01S 13/931
USPC ................................................. 342/195, 196
See application file for complete search history.

(56) References Cited

U.S. PATENT DOCUMENTS

| | | | | |
|---|---|---|---|---|
| 7,675,455 B2 * | 3/2010 | Hatono | | G01S 13/10 |
| | | | | 342/134 |
| 8,314,732 B2 * | 11/2012 | Oswald | | G01S 7/2926 |
| | | | | 342/195 |
| 9,083,419 B2 * | 7/2015 | Alexander | | H04L 25/0204 |
| 9,654,158 B2 * | 5/2017 | Dafesh | | H04B 1/7107 |
| 10,228,449 B2 * | 3/2019 | Nguyen | | H04L 25/03305 |
| 10,234,377 B1 * | 3/2019 | Owechko | | G06F 18/2134 |

(Continued)

FOREIGN PATENT DOCUMENTS

| | | |
|---|---|---|
| DE | 102017007961 A1 | 1/2018 |
| DE | 102020132159 A1 | 6/2022 |
| WO | 2023098809 A1 | 6/2023 |

OTHER PUBLICATIONS

Mun, Jiwoo et al., "A deep learning approach for automotive radar interference mitigation." IEEE 88th Vehicular Technology Conference (VTC—Fall), pp. 1-5, 2018, Chicago, IL, USA.

(Continued)

*Primary Examiner* — Michael W Justice

(57) ABSTRACT

A system includes a transmitter configured to transmit a radar signal towards a target object. A receiver is configured to receive a received signal in response to the transmitted radar signal. The system includes a processor configured to receive, using the receiver, a received signal, execute an iterative procedure using a desired signal prior and an interference signal prior and to determine an estimate of an interference signal component of the received signal and an estimate of the desired signal component of the received signal, wherein the interference signal prior is determined using generative modeling and each iteration of the iterative procedure executes a data consistency operation, use the estimate of the interference signal component and the received signal to determine a desired signal, and processing the desired signal to determine an attribute of the target object.

20 Claims, 7 Drawing Sheets

(56) References Cited

U.S. PATENT DOCUMENTS

| 10,539,652 B2 * | 1/2020 | Chrabieh | G01S 5/0218 |
|---|---|---|---|
| 10,670,698 B2 * | 6/2020 | Melzer | G01S 7/4008 |
| 10,690,748 B2 * | 6/2020 | Paradie | G01S 7/023 |
| 11,002,819 B2 * | 5/2021 | Wittenberg | G01S 13/878 |
| 11,313,950 B2 * | 4/2022 | Kruglick | G06N 3/082 |
| 11,520,031 B2 * | 12/2022 | Chi | G01S 7/415 |
| 12,045,699 B2 * | 7/2024 | DePoy | H04B 17/318 |
| 12,253,626 B2 * | 3/2025 | Zhang | G01S 13/02 |
| 12,287,398 B2 * | 4/2025 | Mansour | G06T 5/60 |
| 2009/0051581 A1 * | 2/2009 | Hatono | G01S 7/285 |
| | | | 342/134 |
| 2016/0341814 A1 * | 11/2016 | Nguyen | H04L 25/03305 |
| 2017/0111069 A1 * | 4/2017 | Dafesh | H04B 1/1027 |
| 2017/0153318 A1 * | 6/2017 | Melzer | G01S 13/343 |
| 2019/0041492 A1 * | 2/2019 | Paradie | G01S 13/931 |
| 2019/0122685 A1 * | 4/2019 | Defraene | G06N 3/08 |
| 2019/0324108 A1 * | 10/2019 | Wittenberg | G01S 13/003 |
| 2020/0003864 A1 * | 1/2020 | Chi | G01S 13/52 |
| 2020/0225321 A1 * | 7/2020 | Kruglick | G01S 7/417 |
| 2020/0292660 A1 * | 9/2020 | Meissner | G01S 7/023 |
| 2021/0132184 A1 * | 5/2021 | Borosak | G01S 7/023 |
| 2021/0132185 A1 * | 5/2021 | Lin | G01S 13/343 |
| 2021/0209453 A1 * | 7/2021 | Meissner | G06N 3/09 |
| 2022/0291329 A1 * | 9/2022 | Fei | G06N 3/08 |
| 2023/0129025 A1 * | 4/2023 | Mansour | G01S 13/89 |
| | | | 342/175 |
| 2023/0144796 A1 * | 5/2023 | DePoy | G06N 20/00 |
| | | | 706/12 |

OTHER PUBLICATIONS

Mun, Jiwoo et al., "Automotive radar signal interference mitigation using rnn with self attention." ICASSP 2020—2020 IEEE International Conference on Acoustics, Speech and Signal Processing (ICASSP), 2020, pp. 3802-3806, Barcelona, Spain.

Nilsson, Jessica et al., "Machine learning for fmcw radar interference mitigation." Thesis. Lund University, 2020, Lund Sweden.

Rock, Johanna et al., "Resource-efficient deep neural networks for automotive radar interference mitigation." IEEE Journal of Selected Topics in Signal Processing, Jun. 2021, vol. 15, No. 4, pp. 927-940.

Chen, Shengyi, et al., "Automotive radar interference mitigation based on a generative adversarial network." IEEE Asia-Pacific Microwave Conference (APMC), pp. 728-730, 2020, Hong Kong.

Ristea, Nicolae-Catalin et al., "Fully convolutional neural networks for automotive radar interference mitigation" 2020 IEEE 92nd Vehicular Technology Conference (VTC2020—Fall), 2020, pp. 1-5, Victoria, BC, Canada.

Griffin, D.W. et al., "Signal estimation from modified short-time fourier transform." IEEE Transactions on Acoustics, Speech, and Signal Processing, Apr. 1984, vol. 32, pp. 236-243.

Lin, Guosheng et al., "Refinenet: Multi-path refinement networks for high-resolution semantic segmentation." 2017 IEEE Conference on Computer Vision and Pattern Recognition (CVPR), pp. 5168-5177, 2017, Honolulu, HI.

Song, Yang et al., "Generative modeling by estimating gradients of the data distribution." Advances in Neural Information Processing Systems 32. 2019, NeurIPS.

Song, Yang et al., "Improved techniques for training score-based generative models." Advances in Neural Information Processing Systems 33, 2020, NeurIPS.

Song, Yang et al., "Score-based generative modeling through stochastic differential equations." ICLR 2021, 2021.

Mncent, Pascal, "A connection between score matching and denoising autoencoders." Neural computation, Jul. 2011, vol. 23, Issue 7, pp. 1661-1674, MIT Press.

Anderson, Brian Do, "Reverse-time diffusion equation models." Stochastic Processes and their Applications 12, 1982, pp. 313-326, North-Holland Publishing Company, Australia.

Boyd, Stephen et al., "Distributed optimization and statistical learning via the alternating direction method of multipliers." Foundations and Trends® in Machine learning, Now the essence of knowledge, 2011, pp. 1-122.

Song, Jiamsong et al., "Pseudoinverse-Guided Diffusion Models for Inverse Problems", International Conference on Learning Representations, 2022, pp. 1-30, Published as a conference paper at ICLR.

Uysal, Faruk, "Synchronous and asynchronous radar interference mitigation", IEEE Access, 2019, pp. 5846-5852, vol. 7.

* cited by examiner

PRE-DERAMP MIXER SIGNAL SPECTROGRAM

5 TARGETS AT DIFFERENT RANGES

1 STRONG INTERFERER (WITH OPPOSING CHIRP RATE)

RADIO FREQUENCY

TIME

202

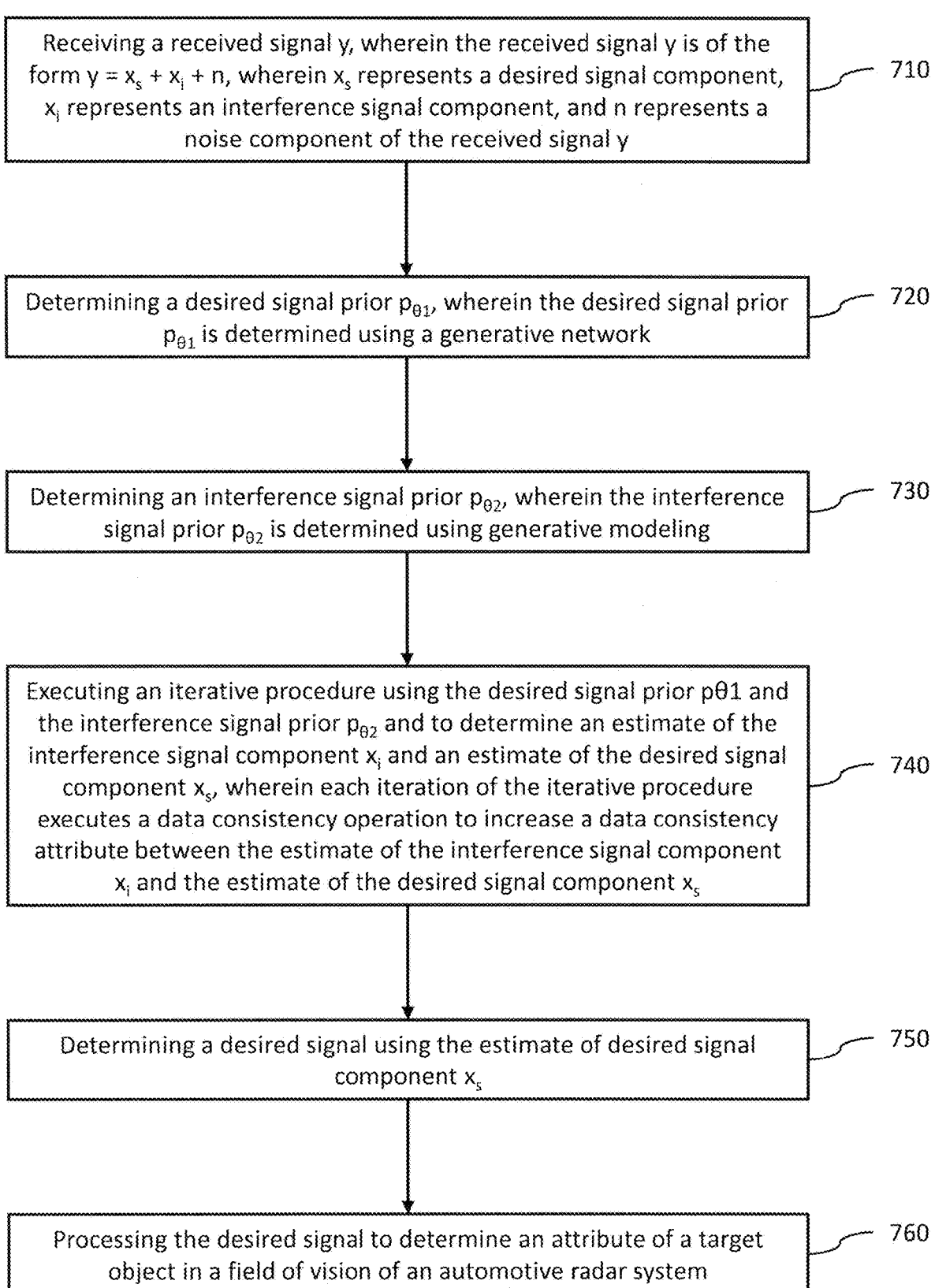

Receiving a received signal y, wherein the received signal y is of the form $y = x_s + x_i + n$, wherein $x_s$ represents a desired signal component, $x_i$ represents an interference signal component, and n represents a noise component of the received signal y — 710

Determining a desired signal prior $p_{\theta 1}$, wherein the desired signal prior $p_{\theta 1}$ is determined using a generative network — 720

Determining an interference signal prior $p_{\theta 2}$, wherein the interference signal prior $p_{\theta 2}$ is determined using generative modeling — 730

Executing an iterative procedure using the desired signal prior $p\theta 1$ and the interference signal prior $p_{\theta 2}$ and to determine an estimate of the interference signal component $x_i$ and an estimate of the desired signal component $x_s$, wherein each iteration of the iterative procedure executes a data consistency operation to increase a data consistency attribute between the estimate of the interference signal component $x_i$ and the estimate of the desired signal component $x_s$ — 740

Determining a desired signal using the estimate of desired signal component $x_s$ — 750

Processing the desired signal to determine an attribute of a target object in a field of vision of an automotive radar system — 760

FIG. 7

RADAR SIGNAL INTERFERENCE MITIGATION WITH GENERATIVE NETWORKS

TECHNICAL FIELD

The present disclosure is directed in general to radar systems and associated methods of operation. In one aspect, the present disclosure relates to a radar system configured to mitigate radar signal interference using generative networks.

BACKGROUND

A radar system transmits an electromagnetic signal and receives back reflections of the transmitted signal. The time delay and/or time delay variation between the transmitted and received signals can be determined and used to calculate the distance and/or the speed of objects causing the reflections, respectively. For example, in automotive applications, automotive radar systems can be used to determine the distance and/or the speed of oncoming vehicles and other obstacles.

Automotive radar systems enable the implementation of advanced driver-assistance system (ADAS) functions that are likely to enable increasingly safe driving and, eventually, fully autonomous driving platforms. Such systems use radar systems as the primary sensor for ADAS operations.

In a particular environment, the accuracy of automotive radar systems can be affected by signals from other radars (also known as radar-to-radar interference), which can reduce the signal-to-noise ratio in received radar reflection signals.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 7 is a flowchart depicting an example method for processing a received radar signal to determine a component of that signal that is an interference signal component enabling determination of a desired signal component.

DETAILED DESCRIPTION

Figure 1:
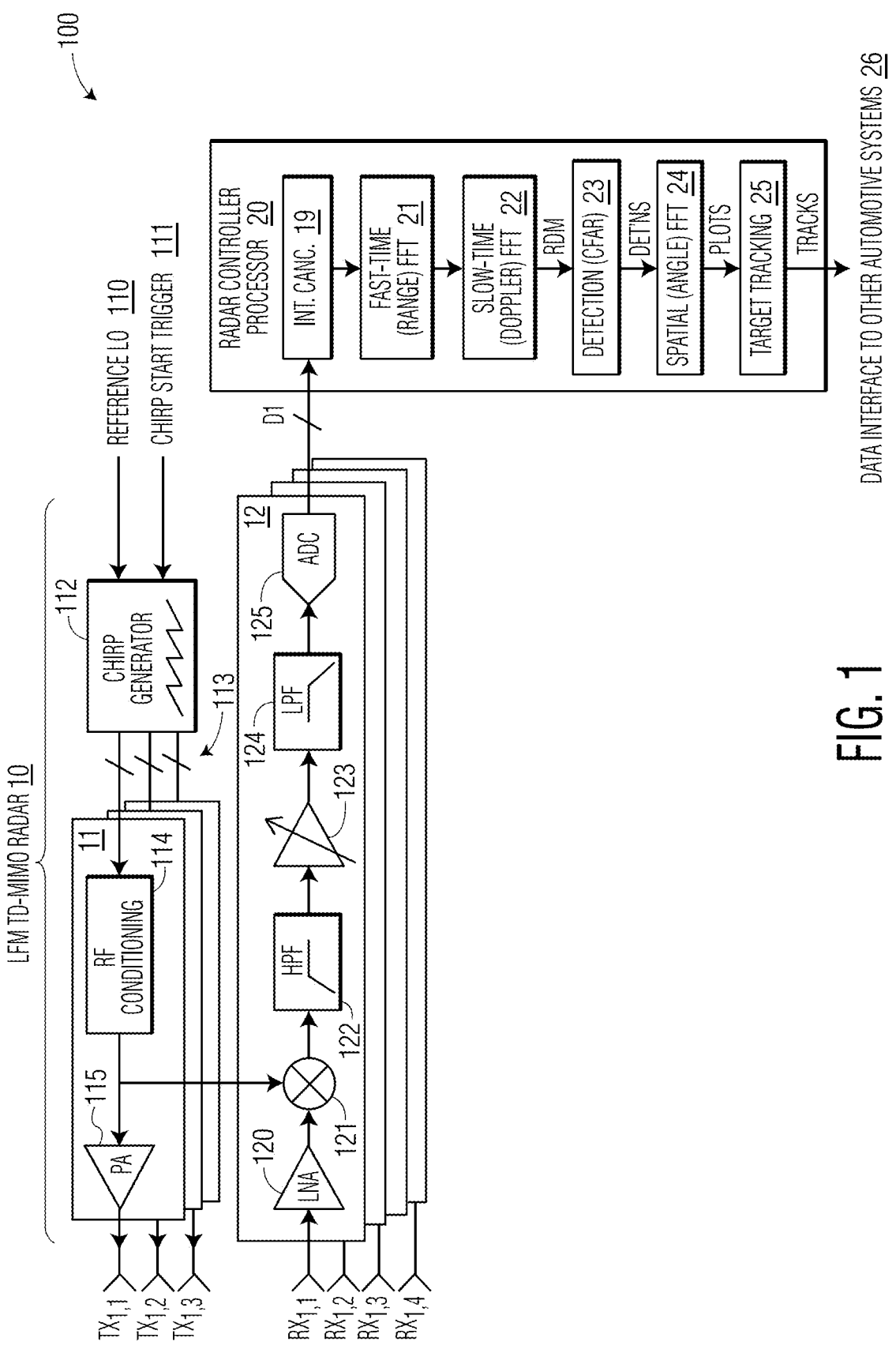
FIG. 1 depicts a simplified schematic block diagram of automotive radar system.

The following detailed description is merely illustrative in nature and is not intended to limit the embodiments of the subject matter of the application and uses of such embodiments. As used herein, the words "exemplary" and "example" mean "serving as an example, instance, or illustration." Any implementation or embodiment described herein as exemplary, or an example is not necessarily to be construed as preferred or advantageous over other implementations. Furthermore, there is no intention to be bound by any expressed or implied theory presented in the preceding technical field, background, or the following detailed description.

Automotive radar systems are used to support advanced driver-assistance system (ADAS) functions like assisted cruise control, emergency braking, and blind spot monitoring and alerts. The efficacy of a radar system is at least partially determined by an amount of signal interference (e.g., signal noise) contained within the reflected radar signals received and processed by the radar system. As the level of interference increases, the signal-to-noise ratio (SNR) in the received reflected signals is reduced, reducing the accuracy of the radar system's determinations.

Interference in automotive radar system applications is generally a growing problem that may impede the development of autonomous vehicles or other vehicles that rely on ADAS that utilize radar systems. As more and more vehicles are equipped with radar systems, this interference problem is expected to increase, potentially exponentially.

There are some existing approaches for mitigating the interference problem in vehicle radar systems, however these tends to rely on manually crafted approaches, such as sparsity-based techniques, or implicitly learned assumptions (e.g., using convolutional neural networks (CNN)) about the interfering and victim radar parameters. Consequently, these approaches rely on certain presumptions that make them less effective in real-world applications in various scenarios.

An improved approach for mitigating signal interference is presented herein, in which generative networks are trained via explicit learning to accurately reconstruct interference signals, which can then be removed from an input signal to determine the desired portion of the input signal.

In various embodiments, the present disclosure provides an approach that provides an interference mitigation solution the utilizes a generative network trained on a wide spectrum of interfering and/or victim radar configurations to determine parameters associated with interference signals in a particular scenario. The approach can be robust, as the generative network can be trained on a large number of interference scenarios, which can include scenarios with different signal-to-interference ratios (SIR), signal-to-noise ratios (SNR), and the presence of an arbitrary number of interferer or target operational radar systems. Using trained generative networks, the approach can provide accurate interference reconstruction, which can assist a radar system in removing interference from received radar systems thereby improving the radar system's capability of detecting weak target objects, even in the presence of strong Gaussian noises.

To illustrate the design and operation of a radar system configured in accordance with the present disclosure, reference is now made to FIG. 1 which depicts a simplified schematic block diagram of automotive radar system 100. The example automotive radar system 100 includes MIMO radar device 10 connected to a radar controller processor 20. In selected embodiments, MIMO radar device 10 may be embodied as a line-replaceable unit (LRU) or modular component that is designed to be replaced quickly at an operating location. Similarly, the radar controller processor 20 may be embodied as a line-replaceable unit (LRU) or modular component. Although a single or mono-static MIMO radar device 10 is shown, it will be appreciated that additional distributed radar devices may be used to form a distributed or multi-static radar. In addition, the depicted radar system 100 may be implemented in integrated circuit form with the LFM TD-MIMO radar device 10 and the radar controller processor 20 formed with separate integrated circuits or chips or with a single chip, depending on the application.

Each radar device 10 includes one or more transmitting antenna elements TXi and receiving antenna elements RXj connected, respectively, to one or more radio frequency (RF)

transmitter (TX) units 11 and receiver (RX) units 12. For example, each radar device (e.g., 10) is shown as including individual antenna elements (e.g., TX1,i, RX1,j) connected, respectively, to three transmitter modules (e.g., 11) and four receiver modules (e.g., 12), but these numbers are not limiting and other numbers are also possible, such as four transmitter modules 11 and six receiver modules 12, or a single transmitter module 11 and/or a single receiver modules 12.

Each radar device 10 also includes a chirp generator 112 that is configured and connected to supply a chirp input signal to the transmitter modules 11. To this end, the chirp generator 112 is connected to receive a separate and independent local oscillator (LO) signal 110 and a chirp start trigger signal 111, though delays are likely to be different due to the signal path differences and programmable digital delay elements in the signal paths. Chirp signals 113 are generated and transmitted to multiple transmitters 11, usually following a pre-defined transmission schedule, where they are filtered at the RF conditioning module 114 and amplified at the power amplifier 115 before being fed to the corresponding transmit antenna TX1,i and radiated. By sequentially using each transmit antenna TX1,i to transmit successive pulses in the chirp signal 113, each transmitter element 11 operates in a time-multiplexed fashion in relation to other transmitter elements because they are programmed to transmit identical waveforms on a temporally separated schedule.

The radar signal transmitted by the transmitter antenna unit TX1,i, TX2,i may be reflected by an object, and part of the reflected radar signal reaches the receiver antenna units RX1,i at the radar device 10. At each receiver module 12, the received (radio frequency) antenna signal is amplified by a low noise amplifier (LNA) 120 and then fed to a mixer 121 where it is mixed with the transmitted chirp signal generated by the RF conditioning module 114. Specifically, mixer 121 is configured to down-convert the RF signal to a baseband signal, meaning that during an acquisition window the target signals result into a superposition of constant-amplitude sinusoidal signals while the interference signal results in a broadband chirp-like signal (i.e., that is time-limited, after anti-aliasing filtering). The resulting intermediate frequency signal is fed to a first high-pass filter (HPF) 122. The resulting filtered signal is fed to a first variable gain amplifier 123 which amplifies the signal before feeding it to a first low pass filter (LPF) 124. This re-filtered signal is fed to an analog/digital converter (ADC) 125 and is output by each receiver module 12 as a digital signal D1. In various embodiments, the receiver module compresses target echoes of various delay signals into multiple sinusoidal tones whose frequencies correspond to the round-trip delay of the echo.

The radar system 100 also includes a radar controller processing unit 20 that is connected to supply input control signals to the radar device 10 and to receive therefrom digital output signals generated by the receiver modules 12.

In selected embodiments, the radar controller processing unit 20 may be embodied as a micro-controller unit (MCU) or other processing unit that is configured and arranged for signal processing tasks such as, but not limited to, target identification, computation of target distance, target velocity, and target direction, and generating control signals. The radar controller processing unit 20 may, for example, be configured to generate calibration signals, receive data signals, receive sensor signals, generate frequency spectrum shaping signals (such as ramp generation in the case of frequency-modulated continuous wave (FMCW) radar) and/ or register programming or state machine signals for RF (radio frequency) circuit enablement sequences.

In addition, the radar controller processor 20 may be configured to program the modules 11 to operate in a time-division fashion by sequentially transmitting LFM chirps for coordinated communication between the transmit antennas TX1,i, RX1,j. The result of the digital processing at the radar controller processing unit 20 is that the digital domain signals D1 are first processed by interference cancellation block 19 to remove interference and noise from the signal D1 received from receiver module 12. That processed signal is then passed to fast-time range frequency Fourier transform (FFT) 21, slow-time FFT 22 for Doppler compression, constant false alarm rate (CFAR) target detection 23, spatial angle estimation 24, and target tracking processes 25, with the result being output 26 to other automotive computing or user interfacing devices for further process or display. When performing target detection, the radar controller processor 20 is configured to determine a range profile of the reflected radar signals, where peaks in the range profile are indicative of potential targets at known ranges.

During operation of automotive radar system 100, radar controller processor 20 transmits control signals to the various components of one or more radio frequency (RF) transmitter (TX) units 11 and receiver (RX) units 12 to control how the radar signals transmitted by automotive radar system 100 are the transmitted signals are shaped and how the received signals are processed. In a specific example, radar controller processor 20 is configured to modulate the power level of signals transmitted by the one or more radio frequency (RF) transmitter (TX) units 11 by transmitting control signal to power amplifier 115 of each of the one or more radio frequency (RF) transmitter (TX) units 11.

In accordance with the present disclosure, interference cancellation 19 as implemented by radar controller processor 20 is configured to provide improved interference mitigation. In a particular vehicle radar scenario, when other radar systems are present in the environment, the signals transmitted by those other radar systems can interfere with the signals being transmitted and/or received by a first radar system (e.g., automotive radar system 100 of FIG. 1). This can be particularly true if the transmitted chirp signals of the various nearby radar systems are at least partially correlated in time and frequency with those of the primary radar system. To illustrate such interference, FIGS. 2-6 are various graphs depicting the effects of signal interference on received FMCW radar signals at different points in the signal processing chain of a radar system receiver caused by the transmissions of other nearby radar systems. FIGS. 2-5 depict an interference scenario in which a strong interferer signal, having an opposite chirp slope from signals being transmitted by the radar system, is present. In the depicted examples, because the chirp rate of the interfering signal is opposite that of the victim radar system, there is only a relatively short period of time during which the interfering signal has the same frequency as the signal being transmitted by the victim radar system. At that time (e.g., when the frequency of the transmitted signal and interfering signal are the same), the interfering signal is received by the victim radar system and fed into the signal processing chain. Specifically, the interring signal is received and processed due to the de-ramp mixing and the low-pass filter (LPF) performed by the signal processing chain implemented by the vehicle radar system's processor (e.g., radar controller processor 20 of FIG. 1).

Figure 2:
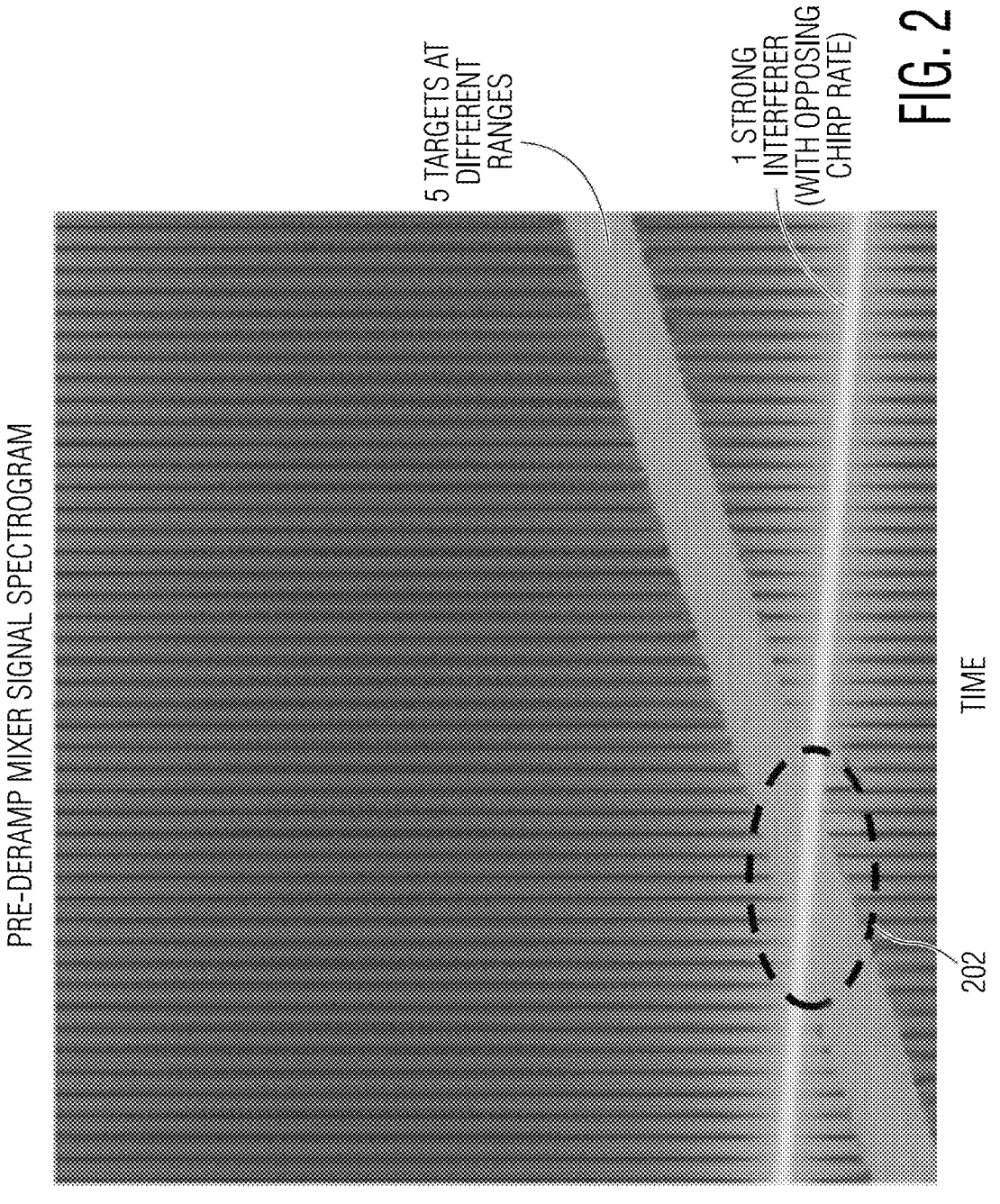
FIGS. 2-5 are graphs depicting the effects of signal interference on received FMCW radar signals.
Figure 3:
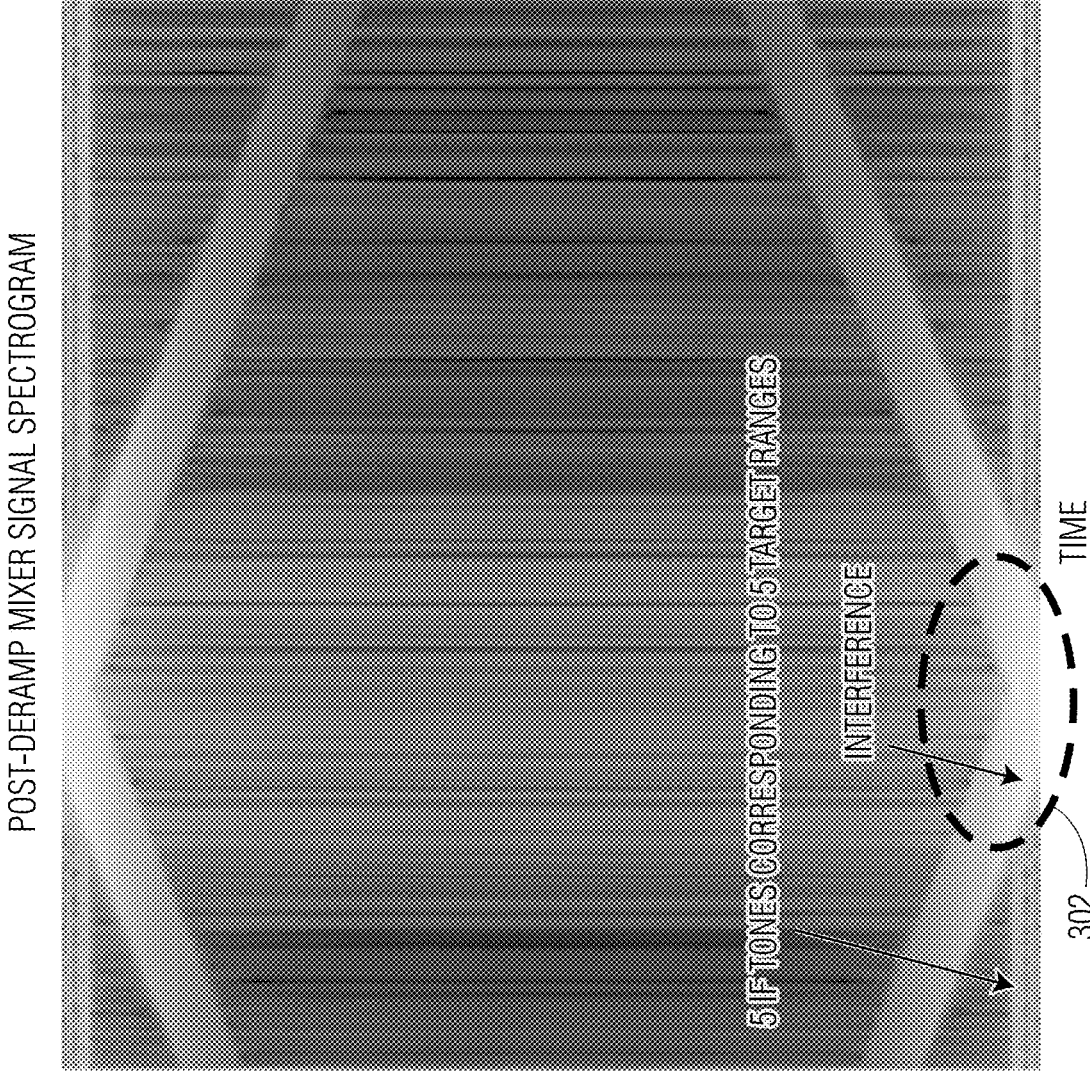

Specifically, FIGS. 2 and 3 are graphs depicting a spectrogram including the received signal in which the vertical axis represents frequency while the horizontal axis represents time. FIG. 2 depicts the opposing chirp from the interfering signal prior to mixer 121. FIG. 3 depicts the interfering condition after mixing and filtering by, for example, mixer 121, high-pass filter 122, first variable gain amplifier 123, and low-pass filter 124 of receiver 12 of automotive radar system 100 of FIG. 1. As depicted in FIGS. 2 and 3, within regions 202 and 302, the interfering signal is at approximately the same frequency as the chirp signal being transmitted by the victim radar system, potential leading to the interfering signal being received and process by the victim radar system.

Figure 4:
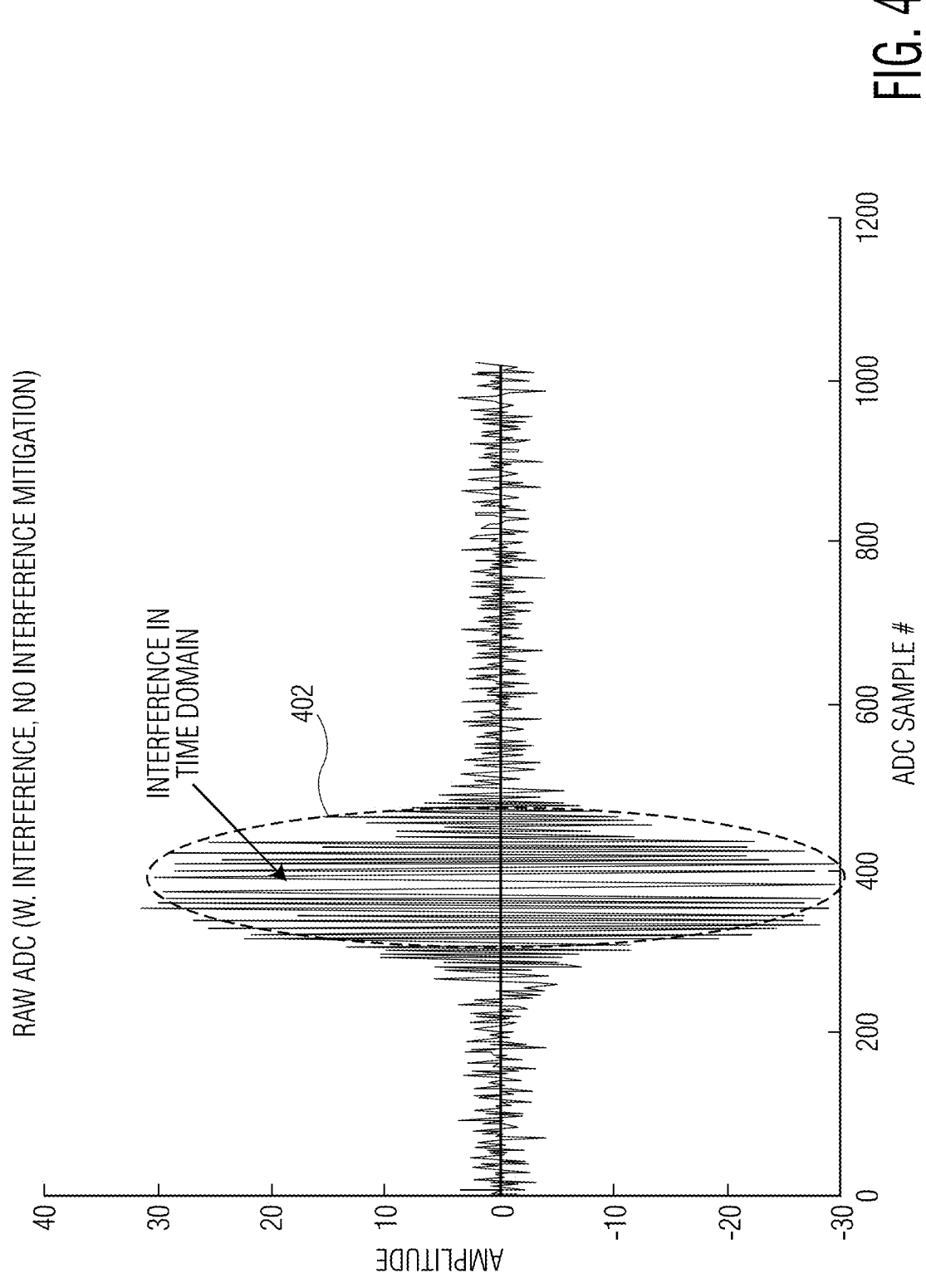
Figure 5:
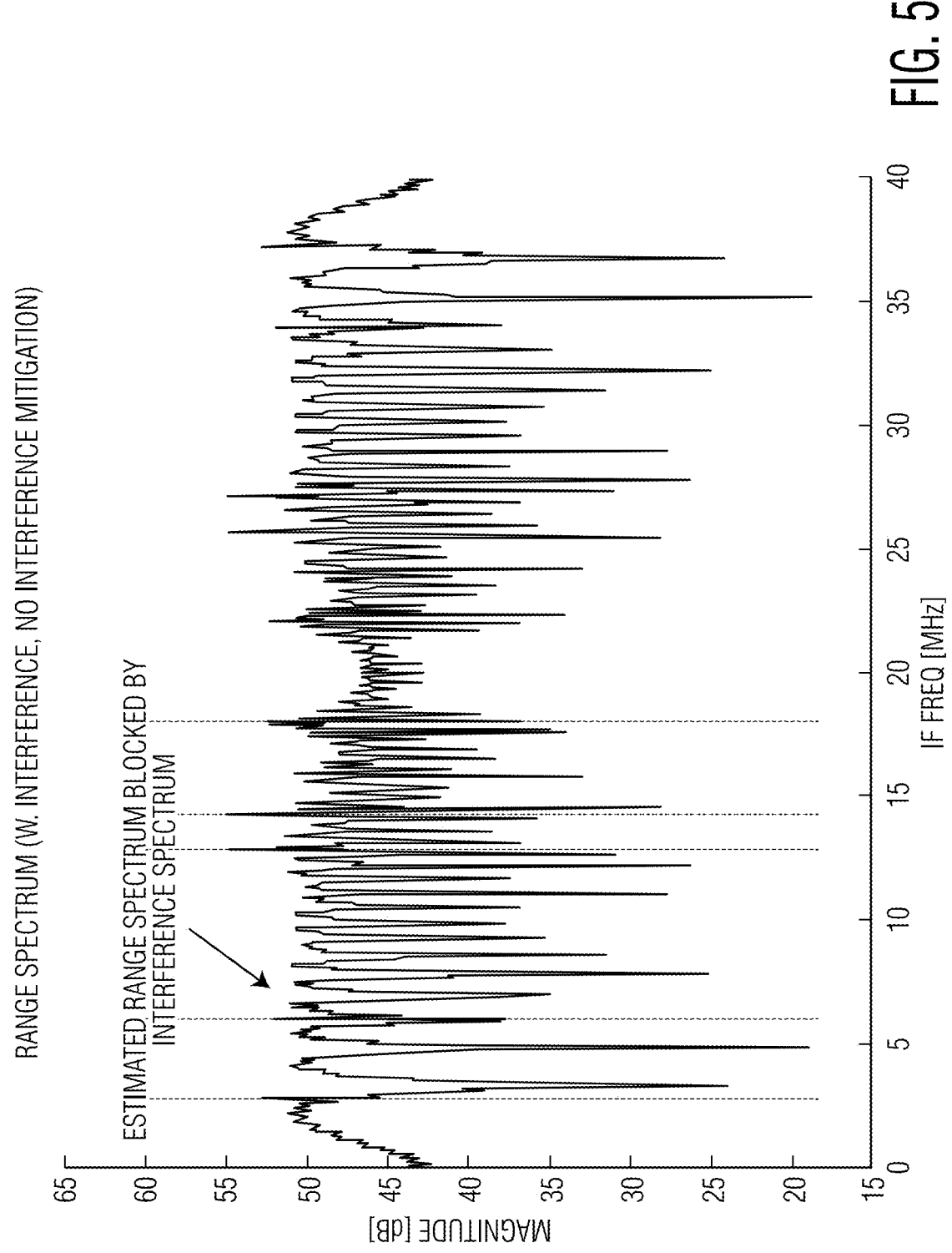

The remaining interfering signal after filtering is further processed and tends to corrupt a portion of the ADC samples generated by the signal processing chain (e.g., signal D1 of FIG. 1), which can be observed in FIG. 4 in region 402 and its effect on the range spectrum is shown in FIG. 5. Specifically, FIG. 4 depicts the raw digital signal representation of the received radar signal in which the vertical axis represents amplitude of the signal, while the horizontal axis represents ADC sample number (which is indicative of time). FIG. 5 depicts the determined range spectrum in which the horizontal axis represents magnitude while the horizontal axis represents IF frequency. As depicted by FIG. 5, when the interring signal is present, the resulting range spectrum is heavily corrupted. Specifically, the interfering signal can cause the noise floor in the range spectrum to rise resulting in desensitization of the radar system.

The example radar system 100 described above and the various examples of interference are presented in conjunction with a radar system 100 configured as an FMCW radar system. It should be understood that embodiments of the present system may be utilized in conjunction with the signals being received and processed by other types of radar systems to remove interference therefrom and increase the accuracy of such radar systems. For example, the radar signals processed in conjunction with the present system may be received by radar systems configured to process signals encoded by bi-phase modulated continuous wave (PMCW), orthogonal frequency division multiplexing (OFDM), or orthogonal time frequency space (OTFS) encoded scheme or any other types of radar systems configured to processed received radar signals and process those signals to identify attributes of target objects in the vicinity (i.e., with a field of vision (FOV)) of the radar system based upon that processing.

The present disclosure provides an approach for mitigating interference in radar systems in which interference is modeled as a source separation optimization problem. The approach uses posterior estimation and/or maximization combined with deep generative modeling (e.g., via generative score networks, diffusion models, or normalizing flows), which determines statistical characteristics of interfering signals and/or desired signal (source) to retrieve an accurate reconstruction of the desired (source) signal. When implementing the present approach, the prior beliefs associated with the desired signal and interfering signal are learned independently (e.g., in an offline process) in the time domain or transformed domains (such as short-time Fourier transform (STFT), wavelet, etc.). Furthermore, priors can be learned for complex data.

In some embodiments, different optimization schemes can be employed to solve posterior maximizations (e.g., (Fast) ISTA, ADMM, or AMP). Although the approaches described herein may operate on individual chirp signals, enabling low latency operation, the approaches may also be extended to data from consecutive chirps and signals captured by multiple receive antennas. The approaches can also be applied to different radar systems using different signal encoding schemes, as described above.

In the present disclosure, the digital signal (y) output by the ADC of a vehicle radar system's signal processing chain (e.g., signal D1 generated by ADC 125 of automotive radar system 100 of FIG. 1) may be modeled by equation (1), below in which $y \in R^l$ represents the observed time-series, and $x_s \in R^l$ and $x_i \in R^l$ correspond to the time-series desired signal and interference, respectively.

$$y = x_s + x_i + n \tag{1}$$

Additionally, $n \in R^l$ denotes an additive Gaussian white noise contained within the signal y. Noise n generally has zero mean and standard deviation $\sigma_n$.

As described above, the presence of aggressive interference $x_i$ in the signal y can deleteriously affect the detection of the desired signal $x_s$. The present disclosure provides approaches for determining or estimating the interference signal $x_i$ and the desired signal $x_s$ from y.

Without prior knowledge of the signal structure and statistical data characterizing $x_s$ and $x_i$, the determination of the signal $x_s$ can be a poorly-condition problem. As described herein, however, this can be addressed via posterior estimation or maximization. Such posterior estimation or maximization processes can incorporate or utilize statistical priors to ensure that such reconstructions are both physically feasible (i.e., data-consistent) and plausible (i.e., consistent with prior belief).

Specifically, presuming that $x_s$ and $x_i$ follow distinct data distributions (e.g., have a particular data distribution in the time domain or another transformed domain) that are generally independent from one another (which is generally the case for FMCW, PMCW, OFDM, and OTFS interference signals), $x_s$ and $x_i$ can be formulated as:

$$x_s, x_i \sim p(x_s, x_i \mid y) \propto p(y \mid x_s, x_i) \cdot p_{\theta 1}(f_1(x_s)) \cdot p_{\theta 2}(f_2(x_i)), \tag{2}$$

In equation (2), $p(x_s, x_i \mid y)$ represents the joint conditional posterior distribution, $p(y \mid x_s, x_i)$ is a measurement likelihood model, described in more detail herein, and $p_{\theta 1}(f_1(x_s))$ and $p_{\theta 2}(f_2(x_i))$ are the desired signal and interference priors that define the data distribution expected in both the desired and interference signals, which utilize explicit modeling, as described herein. The interference prior $p_{\theta 2}(f_2(x_i))$ can be generated using deep generative networks.

Within equation (2), $f_1(\ )$ and $f_2(\ )$ indicate generic signal transformations that may be selected based upon attributes of the signals being processed. Typically, the transformations are selected such that functions $f_1(\ )$ and $f_2(\ )$ provide improved modeling of the signal of interest and/or better separation between the signal of interest and the interference signal. In general, the transformations $f_1(\ )$ and $f_2$ enable improved characterization of the desired and interference signals and are selected depending upon the signal type being processed. Example transformations are illustrated in Table 1, below.

TABLE 1

| 1. | Time domain (no transformation) | $f(x) \rightarrow x$ |
| 2. | (Multi-dimensional) Fourier Transform | $f(x) \rightarrow A_1 x$ |
| 3. | Short-time Fourier Transform (STFT) | $f(x) \rightarrow A_2 x$ |
| 4. | Wavelet Transform | $f(x) \rightarrow W \circledast X$ |

According to Table 1, the data format of the transformed data $f_1(x_s)$ and $f_2(x_i)$ may vary or be selected based on application and depending on the transformation that was used.

Figure 6:
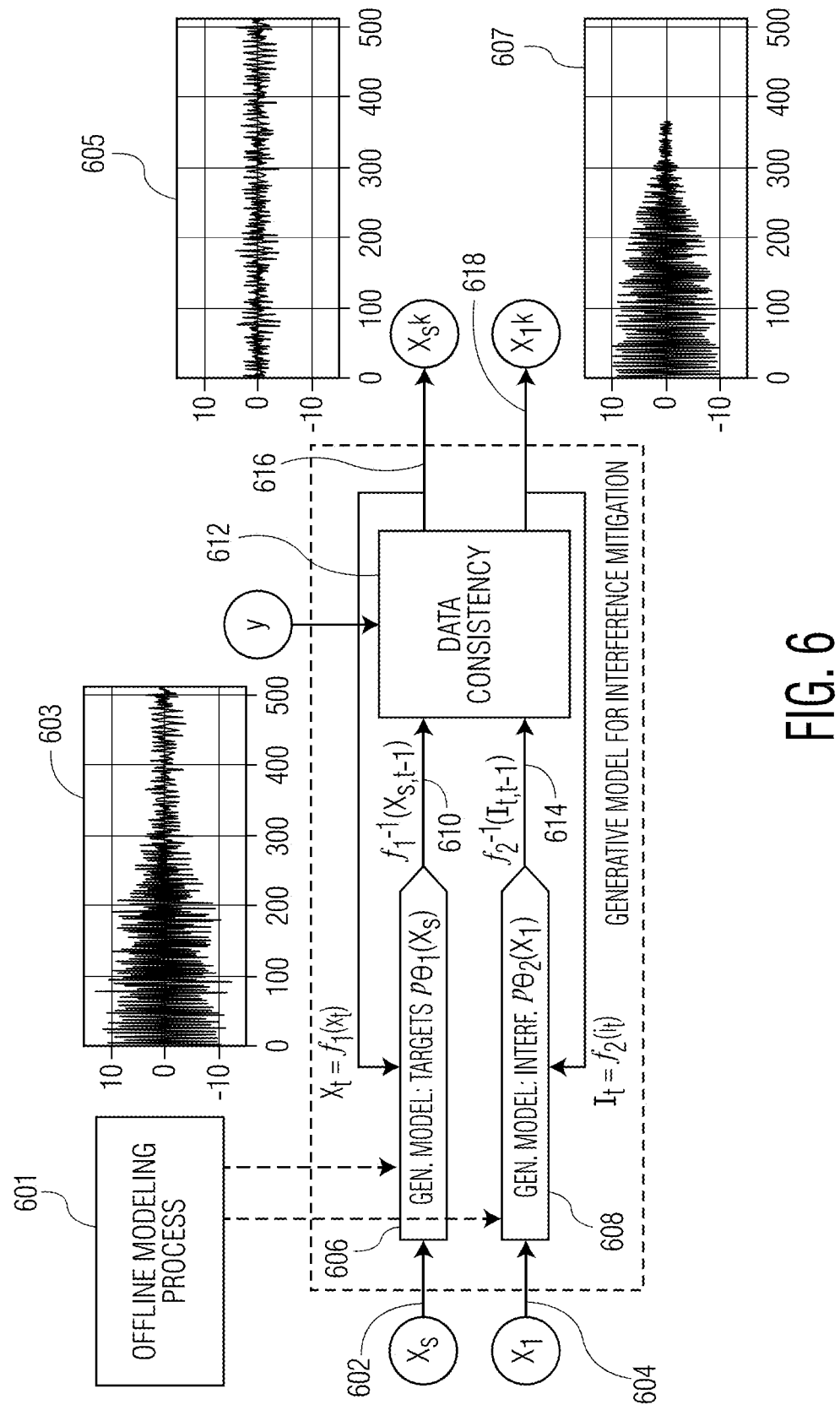
FIG. 6 is a simplified block diagram depicting the present approach for interference mitigation in a radar system.

In the present disclosure, a two-stage approach to solve Equation (2) to determine the interference signal $x_i$ and, consequently, the desired signal $x_s$ is presented. 32 As depicted in FIG. 6, system 600 includes two inputs 602, 604 configured to receive, respectively, inputs of $x_s$ (initialized to the signal y—represented by waveform 603) and $x_i$ (initialized to the signal y).

The first signal input $x_s$ is provided to a generative modeling block 606 after being processed through an initial transformation function $f_1(\ )$ Generative modeling block 606 is configured to retrieve a desired signal prior $p_{\theta 1}(f_1(x_s))$ (generated via an offline modeling process 601 described in more detail herein) and generate an output equal to an estimated desired signal. That output is converted back into its original data format via the function $f_1^{-1}(\ )$ (i.e., the inverse of $f_1(\ )$ and passed to input 610 of data consistency block 612.

Similarly, the second signal input $x_i^0$ is provided to generative modeling block 608 after being processed through an initial transformation function $f_2(\ )$ Generative modeling block 608 is configured to retrieve an interference signal prior $p_{\theta 2}(f_2(x_i))$ (generated via offline modeling process 601 described in more detail herein) and generate an output equal to an estimated interference signal. That output is converted back into its original data format via the function $f_2^{-1}(\ )$ (i.e., the inverse of $f_2(\ )$ and passed to input 614 of data consistency block 612. Data consistency block 612 operates a data consistency operation configured to align the signal estimates outputted by data consistency block 612 after iteration with the observation signal y. This enables the estimate of the desired signal and the interference signal generated by system 600 to be guided into the right direction of the observed data after every new estimate/iteration. The modified outputs of data consistency block 612 $\hat{x}_s^k$ and $\hat{x}_i^k$ are fed back into generative modeling block 606 and generative modeling block 608, respectively, enabling the method to iterate thereby refining the estimated desired signal and interference signal outputs. At the same time, the outputs of data consistency block 612 $\hat{x}_s^k$ and $\hat{x}_i^k$ (which are being continuously refined) are generated as outputs of system 600 at outputs 616, 618, respectively. An example of the output signal $\hat{x}_s^k$, which is the estimate of the desired signal component, is illustrated by waveform 605. An example of the output signal $\hat{x}_i^k$, which is the estimate of the interference signal component, is illustrated by waveform 607. The feedback loop illustrated in FIG. 6 may, in various embodiments, be executed through a predetermined number of iterations before the final output signals are generated at outputs 616 and 618 of data consistency block 612. The predetermined number may be set forth as a hyperparameter of the generative model. In some other cases, the approach may be iterated until a particular stopping condition is satisfied, at which time the outputs are generated by system 600. An example stopping criteria may include that the magnitude of the change in output from one iteration to the next fall below some predetermined threshold.

In various embodiments, the functional components of system 600 may be implemented by any suitably configured device processor, such as radar controller processor 20 of automotive radar system 100 of FIG. 1, or any other controller, processor, or system or device configured to process received radar signals y of a radar system. Aspects of system 600, such as offline modeling process 601 may be implemented in computer systems that are separate from the other components of system 600, such that offline modeling process 601 may be implemented in a different location and may generate priors $p_{\theta 1}$ and $p_{\theta 2}$ in an offline manner from the operations of other components of system 600. In a specific embodiment, components of system 600, which may not include offline modeling process 601, may be implemented within interference cancellation 19 of the signal processing system of radar controller processor 20 of FIG. 1.

Although not shown in FIG. 6, in the present two-stage approach for interference mitigation, a preliminary offline training process is utilized to develop explicit models (i.e., $p_{\theta 1}(f_1(x_s))$ and $p_{\theta 2}(f_2(x_i))$) of the desired signal and the interference signal. The results of this preliminary step are provided to system 600 as prior knowledge (i.e., to each of generative modeling block 606 and generative modeling block 608) and can be performed offline. In this initial step, the learned parameters are fixed and reused during the inference stage. The functional components configured to implement this second stage are depicted in FIG. 6 in which the learned data-driven interference priors is used in combination with the learned or model-based desired signal prior to separate the two signals from noise-corrupted observations (i.e., the signal y) using the signals' distinct statistical characteristics reflected in the priors.

Once determined, the recovered interference signal (i.e., x̃k) can be subtracted from the noisy observations of signal y to determine the desired signal x̂ŝk to identify even weak target object signals within the FOV of the radar system that may be buried under the noise floor that may be recovered via downstream signal aggregation. That is:

$$\bar{x}_s = y - \hat{x}_i. \tag{3}$$

Consequently, the problem can therefore be interpreted as the accurate reconstruction of the interference from noise-contaminated observations, potentially containing the desired signal of various strengths. In one case, the direct estimate $\hat{x}_i$ could be taken as the output of system 600.

In some embodiments of the present system, a solution to Equation (2) is provided that is based upon the structured nature of the interference signal in a magnitude time-frequency domain signal. To summarize, initially, a transformation (e.g., an STFT) is applied to the observed time-series signal (e.g., signal D1 of FIG. 1) to provide a mapping of the signal to a basis (e.g., time-frequency, time-frequency-space) that facilitates separation of the interference signal. Next, a generative score network is used to capture unique statistical characteristics of the interference signal in the magnitude time-frequency domain. Soft thresholding is utilized to describe the desired signal in the Fourier spectrum. Furthermore, priors are incorporated into an ISTA-based algorithm for solving the Maximum-a-posteriori (MAP) estimation, as follows:

9

$$\hat{x}_s, \hat{x}_i := \operatorname*{argmin}_{x_s, x_i} \|y - x_s - x_1\|_2^2 + \lambda_1 \|f_1(x_s)\|_1 + \lambda_2 p_{\theta_2}(|f_2(x_i)|). \quad (4)$$

In equation (4), f1 denotes a Fourier transformation and f2 represents a STFT.

When implementing the present approach, in an initial step a preliminary offline stage is implemented wherein a generative score network is used to determine interference signal prior $p_{\theta 2}$. Generative score networks are a class of generative networks that rely on modeling the gradient of the log-probability distribution of samples $\nabla_x \log p_\theta(x)$ (i.e., the score function) rather than directly modeling priors $p_0$. This can allow for greater flexibility in the network architecture design. In some embodiments, the generative score networks can be generated using a U-NET based network architecture in which the input dimension of the network matches the output dimension of the network. One common approach to train score-based networks is through denoising score matching, as follows:

$$\frac{1}{2L} \sum_{i=1}^{L} \mathbb{E}_{p_{data}(x)} \mathbb{E}_{p_{\sigma_i}(\tilde{x}|x)} \left[ \left\| \sigma_i s_\theta(\tilde{x}, \sigma_i) + \frac{\tilde{x} - x}{\sigma_i} \right\|_2^2 \right]. \quad (5)$$

Equation (5) is a general loss function that can be used to optimize the score networks. Below, we explain that in this specific implementation, it is done separately for the targets-only signals and the interference-only signals, possibly each in a transformed domain.

This involves perturbing the interference samples (e.g., the targets-only or interference-only signals) with additive Gaussian noise having a range of standard deviations. The generative network is then trained to estimate the gradients of these perturbed samples by implicitly learning how to map back to clean data samples (e.g., data samples that have not been perturbed by the Gaussian noise function). Drawing new samples from the resulting learned probability distribution is done in various ways, for instance, via iterative gradient-ascent-based algorithms.

When operating the generative score network to determine priors $p_{\theta 2}$, the generative network can be trained using sample data generated, for example, by putting the radar receiver into a listening-only mode and enabling the radar system to record signals received via the RX receiver unit (e.g., RX unit 12 of FIG. 1) and the corresponding received signal processing chain implemented by the radar system's control processor (e.g., radar controller processor 12 of FIG. 1). In that configuration, data captured in the listening-only mode will only receive noise and interference signals and will not include a desired signal, such as those generated when the radar system is actively transmitted. The data captured in the listening-only mode is received and utilized as an input training set (e.g., with perturbation) for training the generative network. Specifically, a generative modeling approach can be used to capture the statistical characteristics of the collected interference samples.

With the interference signal prior $p_{\theta 2}$ determined, in the second, inference, stage a posterior maximization process is used to estimate the interfering and desired signal. At each step or iteration of that process, a data consistency step is executed so that the estimated signals adhere to the inputs (observations) of the received signal y. At the same time, the values in the estimated interference and desired signals are iteratively nudged towards the target data distributions, as indicated by the determined priors $p_{\theta 2}$. As this step is

10 iterated, the estimates of the interference signal and the desired signal become more accurate until satisfactory (and in some cases, optimal) estimates are generated, as described below. In a specific embodiment, this involves solving equation (4) using an iterative shrinkage-thresholding algorithms (ISTA) optimizer. In such an optimization process involves alternating between the gradient ascent and data consistency steps of the ISTA optimizer, starting with initializing both the desired signal and interference signal as the observation in the time domain. The learned score function $S_\theta(|f_2(x_i)|)$ is then used for approximating $\equiv_{|f_2(x_i)|}$ log $p\theta_2(|f_2(x_i)|)$, with $C_i$ denoting the complex time-frequency representation of interference, which, in this example, is generated by applying an STFT to the interference signal, and $c_s$ representing the sparse coefficients corresponding to the desired signal in the Fourier domain. At iteration k, the current estimate of the interference signal is moved in the direction of the target or desired statistical features, exploiting the pre-trained generative score network as a gradient vector field that points to the high-likelihood region of the corresponding data distribution:

$$|\hat{C}_i^k| = |\hat{C}_i^{k-1}| + \lambda_1 s_\theta(|\hat{C}_i^{k-1}|, \sigma_1^k), \quad (6)$$

In Equation (6), the ratio $\lambda_1/\sigma_i^k$ determines the regularization level during the k-th iteration. Subsequently, data consistency is performed on the estimated interference again in the magnitude time-frequency domain:

$$|\hat{C}_i^k| = |\hat{C}_i^k| - \mu_1 \left( |f_2(y)| - |\hat{C}_i^k| - |f_2(f_1^{-1}(\hat{c}_s^{k-1}))| \right), \quad (7)$$

In Equation (7), $f_1^{-1}(\bullet)$ denotes the inverse Fourier transformation (i.e., the opposite function of $f_1(\ )$, and $\mu_1$ tunes the data consistency level, determining how much the estimated interference should adhere to the observation in the magnitude time-frequency domain. The estimated interference in the magnitude time-frequency domain is transformed back to the time domain via:

$$\tilde{x}_i^k = f_2^{-1} \left( |\hat{C}_i^k| \cdot e^{j \angle \hat{C}_i^{k-1}} \right), \quad (8)$$

In Equation (8), $f_2^{-1}(\ )$ denotes the inverse of function $f_2(\ )$ (i.e., the inverse STFT), and $$\angle \hat{C}_i^{k-1}$$

is un phase component of the time-frequency representation of the estimated interference from the last iteration.

The estimated desired signal is then estimated by a proximal step that includes soft thresholding in the Fourier domain. That estimated signal is then transformed back to the time domain using $f_1^{-1}$. A data consistency step is then performed in the time domain:

$$\tilde{x}_i^k = f_1^{-1} \Gamma_{\lambda_2}(\hat{c}_s^{k-1}) - \mu_2 \left( y - f_1^{-1}(\Gamma_{\lambda_2}(\hat{c}_s^{k-1})) - \tilde{x}_i^k \right). \quad (9)$$

In Equation (9), $\Gamma_{\lambda_2}(\bullet)$ symbolizes a soft thresholding operation, with the sparsity level set as $\lambda_2$. The parameter $\mu_2$ adjusts the data consistency step, determining how much the estimated desired signal should adhere to the observation in the time domain. A data consistency step is then performed on the estimated time-series interference as follows:

$$\hat{x}_i^k = \tilde{x}_i^k - \mu_3\left(y - \hat{x}_i^k - \tilde{x}_i^k\right), \qquad (10)$$

In equation (10), the parameter $\mu_3$ tunes the data consistency level, determining how much the individually estimated interference and estimated target signal should adhere to the observation in the time domain.

After the algorithm converges, it is possible to obtain the estimated time series interference signal $\hat{x}_i$. The algorithm may be determined to have converged after a fixed number of total iterations. In that case, the fixed number of total iterations can be at least partially determined by model hyperparameter tuning. Alternatively, as the algorithm runs until a particular stopping condition is satisfied, at which time the output of the model is considered the final output. An example stopping criteria may be that the magnitude of the change in outputs of the model from one iteration to the next fall below some predetermined threshold. At that time is can be determined that the algorithm has converged, and the estimated interference signal can then be subtracted from the observation signal y in the same domain to obtain the estimated desired signal with the potential environmental noises, typically Gaussian, accompanied.

In one implementation of this approach for interference mitigation, a system was trained using a simulated ADC (time-series) dataset, which was randomly split into a training set of 40,000 samples, a validation set of 6,000 samples, and a test set of 500 samples. The key parameters used to generate each sample are listed in

TABLE 2

| Paramet | Minimum | Maximum | Step |
|---|---|---|---|
| Number of desired signal | 1 | 2 | * |
| SIR (GB) | −5 | 40 | 5 |
| Target amplitude | 0.1 | 1 | * |
| Target distance (m) | 2 | 200 | * |
| Target phase (rad) | −π | π | * |
| Number of interference | 2 | 3 | * |

Table 1, below.

In Table 2, the first column represents key parameters for the simulated dataset generalization. The symbol * denotes a value that is randomly selected from a uniform distribution.

Using the training data, score-based networks are first pre-trained on magnitude time-frequency data. The data can be obtained by applying STFT to the time-series training samples in the original training data set. During the pre-training (i.e., offline) process, the network parameters are optimized using denoising scoring approaches, such as those illustrated by equation (5), above. This aims to minimize the empirical average of the Euclidean distance between the score of the training samples and the gradients of the added zero mean Gaussian noises with varying noise levels.

Following pre-training, the learned generative score prior is integrated into the ISTA algorithm, as described above. Hyperparameters, including regularization terms, data consistency terms, and the number of total iterations, are then fine-tuned based on a subset of time-series validation samples. Bayesian optimization can be used to fine-tune the hyperparameters, with the objective of minimizing the difference between the reconstructed and ground-truth interference in both the time-frequency and time domains.

This implementation is then compared against other approaches of interference calculation, which includes conventional zeroing methodologies in which interference is first detected and then canceled out through a conventional thresholding technique. Gaps caused by cancellations can then be filled with zeros. Comparison against two such zeroing methods including time-domain zeroing (TDZ) and time-frequency domain zeroing (TFDZ) is provided. Another interference mitigation approach, referred to as the 'sparse prior' approach, operates under the assumption that the desired signal and interference signal are sparse (e.g., containing greater than 80% zero values or a greater percentage of zero values) in alternative domains. These other approaches use an optimizer based on the Alternating Direction Method of Multipliers (ADMM).

The present algorithm evaluated the baselines on the test samples within the range spectrum, utilizing evaluation metrics as the ratio of the target peaks to the strongest sidelobe in the decibel (dB) scale. Additionally, various Gaussian noises with zero mean and standard deviation $\sigma_n$ were introduced to assess the robustness of the present approach against environmental noises. The quantitative results of the ratio of the target peaks to the strongest sidelobe are shown in Table 3, below.

TABLE 3

| Noise level $\sigma_n$ | TDZ | TFDZ | Sparse prior | Present approach |
|---|---|---|---|---|
| 0.0 | −11.908 dB | 15.673 dB | 9.720 dB | 34.330 dB |
| 0.5 | −12.680 dB | 9.218 dB | −3.984 dB | 25.376 dB |
| 1.0 | −14.405 dB | 5.379 dB | −12.195 dB | 21.724 dB |
| 1.5 | −16.360 dB | 0.188 dB | −18.572 dB | 19.078 dB |
| 2.0 | −20.172 dB | −2.116 dB | −25.496 dB | 15.317 dB |

In Table 3, the first column represents a noise level on in the original signal samples being processed. The second column represents the ratio of the target peaks (e.g., the signal-to-noise ration) for the processed signal using the TDZ interference mitigation approach. The third column shows the same data for the TFDZ interference mitigation. The fourth column shows the same data for the sparse prior approach to interference mitigation, while the fifth column shows the results for the present method.

As illustrated by Table 3, across all noise levels, the ratio of target peaks, or the SNR, is greatest (indicating better performance) with the present method by a significant margin.

In another embodiment, equation (2) is solved using posterior sampling with generative score-based diffusion models. This approach expands upon the approach described above, in which the input data is perturbed with a discrete or finite number of noise levels (e.g., determined by injecting Gaussian noise with different discrete standard deviations) to an approach that uses an infinite number of noise levels. Specifically, the approach defines a diffusion process, denoted as $$\{x^t\}_{t=0}^T$$

which is indexed by a continuous time variable $t \in [0, 1]$. This process starts from a clean sample $x^0$ drawn from a distribution $p(x^0)$ at $t=0$. This is subsequently formulated using stochastic differential equations (SDE). Consequently, the data perturbation process leveraging the forward SDE can therefore be written as follows:

$$dx^t = f(t)x^t dt + g(t)dw, \qquad (11)$$

In equation (11), w is the standard wiener process, and f(t) is the drift coefficient, representing the deterministic evolution of $x^t$ at each time t, while g(t) denotes the diffusion coefficient, quantifying the level of stochasticity introduced at each time t. This process assists in mapping the data distribution $p(x^0)$ to a pre-defined base distribution $p(x^T)$, from which samples can be generated efficiently. As a result, it is feasible to generate samples from the data distribution $p(x^0)$ by reversing the perturbation (diffusion) process. This can be achieved through the use of a reverse-time SDE. The formulation is as follows:

$$dx^t = \left[ f(t)x^t - g(t)^2 \nabla_{x^t} \underbrace{\log p(x^t)}_{score} \right] dt + g(t)w^{-t}. \qquad (12)$$

In equation (12), the score, representing the gradient of the log probability density of target data samples, is important in the reverse diffusion process. Functioning as a vector field, the score points at the high likelihood regions within the data distribution, thus guiding the evolution of $x^t$, from, for example, random noises to novel data samples.

The score function can be learned utilizing generative score-based networks via denoising score matching, as in equation (5), described above. Unlike the discrete generative score-based network in the first embodiment, here a time-dependent generative score-based network can be denoted as $s_\theta(x,t) \approx \nabla_{x^t} \log p(x^t)$.

In this approach, leveraging posterior sampling to sample desired signals from the joint conditional posterior distribution of equation (2) by integrating the core concepts of diffusion process can be an effective strategy for interference mitigation. To sample from the posterior $$p(x_s^t, x_i^t | y),$$

the joint conditional reverse-time diffusion SDE is defined as follows:

$$d(x_s^t, x_i^t) = \left( f(t)(x_s^t, x_i^t) - g(t)^2 \nabla_{x_s^t, x_i^t} \log p(x_s^t, x_i^t | y) \right) dt + g(t)\overline{w}^t. \qquad (13)$$

The joint conditional reverse-time SDE of equation (13), expanded from equation (12), can be efficiently calculated using gradients of the posteriors. However, to accomplish this, it is necessary to factorize the expression equation 13 into two individual score models while both models remain connected via the data consistency term. The gradient of each posterior can be obtained from the following mathematical expressions:

$$\nabla_{x_s^t} \log p(x_s^t, x_i^t | y) \approx s_{\theta_2}(x_s^t, t) + \nabla_{x_s^t} \log p(y | x_s^t, x_i^t) \qquad (14)$$

$$\nabla_{x_i^t} \log p(x_s^t, x_i^t | y) \approx s_{\theta_2}(x_i^t, t) + \nabla_{x_i^t} \log p(y | x_s^t, x_i^t).$$

In equation (14), $$s_{\theta_2}(x_s^t, t)$$

and $$s_{\theta_2}(x_i^t, t)$$

denote the score functions of the prior distributions of the desired and interference signals, respectively. The terms $$\nabla_{x_s^t} \log p(y | x_s^t, x_i^t)$$

and $$\nabla_{x_s^t} \log p(y | x_s^t, x_i^t)$$

correspond to the gradient of the perturbed data likelihood, which is typically intractable. Consequently, the posterior sampling inference process at each timestep t involves two steps: following the priors and adhering to the data consistency term.

In the first of the two steps, for radar signal applications, the specific desired signal score function $$s_{\theta_1}(x_s^t, t)$$

can be learned, approximated using a deterministic signal prior, or defined analytically. For instance, in the case of a deterministic signal prior, a suitable prior for target reflections in the Fourier domain could be a Laplace distribution:

$$\text{Laplace } (x; \mu, \gamma) = \frac{1}{2\gamma} \exp(-|x - \mu|)/\gamma.$$

Gaussian noise added throughout the forward diffusion process, as defined in (11), can equal $x^t = \alpha_t x^0 + \beta_t w$ at every timestep $t\alpha_t$ and $\beta_t$ and corresponds to scalars defined by the selected SDE process. Therefore, the summation of two random variables results in the convolution of the two independent distributions, namely the Laplace distribution $p(\alpha_t x^0)$ and the (complex) Normal distribution $p(\beta_t w)$: $p(\alpha_t x^0) * p(\beta_t w)$. It can be analytically derived that, under the assumption of Gaussian noise, the proximal operator for the maximum a posteriori probability (MAP) estimator of a signal that follows $$s_{\theta_1}(x_s^t, t)$$

with a Laplace distribution is the soft-thresholding function, which can be used as a scoring function. A complex soft-thresholding function can be used for denoising complex Fourier transformed data, therefore generating estimates of $x_s^{0|t}$.

Utilizing the continuous generative score-based network $s_{\theta_2}(x'_i, t)$, it is possible to learn the prior distribution of the interference's score function. This can be accomplished in the time domain or in a transformed domain, as described above. After that learning process, it is possible to conduct unconditional sampling from the learned generative score-based network, utilizing various numerical samplers, such as Langevin dynamics.

Typically, unlike $p(y|x^0_i, x^0_s)$, the likelihood term $p(y|x'_i, x'_s)$ is intractable. Hence, it is possible to adopt the approach proposed in equation (11) to formulate the perturbed data likelihood term as follows:

$$p(y\,|\,x'_s, x'_i) \approx p\!\left(y\,\Big|\,x_s^{0|t}, x_i^{0|t}\right) = \mathcal{N}(\mu^t, \Sigma^t). \tag{15}$$

In equation (15), $$\mu^t = x_s^{0|t} + x_i^{0|t}$$

and $\Sigma^t = (r^t)^2 I + (q^t)^2 I$, where $r^t$ and $q^t$ define the standard deviation at timestep t.

Moreover, the term $$x_i^{0|t} x_i^{0|t}$$

(the same process for $$x_s^{0|t} x_s^{0|t}$$

can be formulated employing Tweedie's formula:

$$x_i^{0|t} = \mathbb{E}\!\left[x_i^0 \,\middle|\, x_i^t\right] = \frac{1}{\alpha_t}\!\left(x_i^t + (\beta^t)^2 \nabla_{x_i^t} \log p(x_i^t)\right) \approx \frac{1}{\alpha_t}\!\left(x_i^t + (\beta^t)^2 s_\theta(x_i^t, t)\right). \tag{16}$$

It is then possible to derive the score function of equation (15) and perform the data consistency steps as follows:

$$\nabla_{X_{ts}} \log p(y\,|\,x_{ts}, X_{ti}) \approx \left(\nabla_{x_{st}} x_{s0|t}\right) A_T \sum\nolimits_{-1}\!\left(y - x_{0s|t} - x_{0i|t}\right) \tag{17}$$

$$\nabla_{X_{ti}} \log p(y\,|\,x_{ts}, X_{ti}) \approx \left(\nabla_{x_{ti}} x_{0i|t}\right) \sum\nolimits_{-1}\!\left(y - x_{0s|t} - x_{i0|t}\right)$$

FIG. 7 is a flowchart of an example method for processing a received radar signal to determine a component of that signal that is an interference signal component enabling determination of a desired signal out of the received signal. The method may be implemented by any suitably configured signal processing system of a radar system (e.g., an automotive radar system), such as system 100 of FIG. 1 implementing the functionality of system 600 of FIG. 6.

Referring to FIG. 7, at step 710, a received signal y is received (e.g., due to reflections from target objects in the FOV of the radar system). The received signal y is of the form $y=x_s+x_i+n$, wherein $x_s$ represents a desired signal component, $x_i$ represents an interference signal component, and n represents a noise component of the received signal y. At step 720, a desired signal prior poi is determined, wherein the desired signal prior $p_{\theta 1}$ is determined using a generative network. The desired signal prior $p_{\theta 1}$ may be determined via an 'offline' process, as described above. Similarly, at step 730, an interference signal prior $p_{\theta 2}$ is determined, wherein the interference signal prior $p_{\theta 2}$ is determined using generative modeling.

With the interference and desired signal priors determined, at step 740, the processor is configured to execute an iterative procedure using the desired signal prior $p_{\theta 1}$ and the interference signal prior $p_{\theta 2}$ to determine an estimate of the interference signal component $x_i$ and an estimate of the desired signal component $x_s$. Each iteration of the iterative procedure executes a data consistency operation to increase a data consistency attribute between the estimate of the interference signal component $x_i$ and the estimate of the desired signal component $x_s$. Then, at step 750, a desired signal is determined using the estimate of desired signal component $x_s$ and at step 760, the desired signal is processed to determine an attribute (e.g., a range, distance, velocity, angle) of a target object in a field of vision of an automotive radar system.

In some aspects, the techniques described herein relate to an automotive radar system, including: at least one transmitter and at least one receiver, wherein the at least one transmitter and the at least one receiver are configured to transmit and receive radar signals, wherein the at least one transmitter and the at least one receiver are coupled to a vehicle; and an automotive radar processor, configured to: transmit, at a first time, a first radar signal, receive, using the at least one receiver, a received signal y, wherein the received signal y is of the form $y=x_s+x_i+n$, wherein $x_s$ represents a desired signal component, $x_i$ represents an interference signal component, and n represents a noise component of the received signal y, determine a desired signal prior $p_{\theta 1}$, wherein the desired signal prior $p_{\theta 1}$ is determined using generative modeling, determine an interference signal prior $p_{\theta 2}$, wherein the interference signal prior $p_{\theta 2}$ is determined using generative modeling, execute an iterative procedure using the desired signal prior $p_{\theta 1}$ and the interference signal prior $p_{\theta 2}$ and to determine an estimate of the interference signal component $x_i$ and an estimate of the desired signal component $x_s$, wherein each iteration of the iterative procedure a data consistency operation to increase a data consistency attribute between the received signal y, the estimate of the interference signal component $x_i$ and the estimate of the desired signal component $x_s$, and determine a desired signal using the estimate of desired signal component $x_s$, and process the desired signal to determine an attribute of a target object in a field of vision of the automotive radar system.

In some aspects, the techniques described herein relate to an automotive radar system, wherein the automotive radar processor is configured to determine the desired signal by subtracting the estimate of the interference signal component $x_i$ from the received signal y to determine the desired signal.

In some aspects, the techniques described herein relate to an automotive radar system, wherein the interference signal prior $p_{\theta 2}$ is determined by performing denoising score matching on a training data set, wherein the training data set includes simulated time-domain interference signals.

In some aspects, the techniques described herein relate to an automotive radar system, wherein values in the training data set are modified by adding Gaussian noise values to the values in the training data set to generate a modified training data set, wherein Gaussian noise values added to the values in the training data set have a range of standard deviations.

In some aspects, the techniques described herein relate to an automotive radar system, wherein the generative modeling is configured to estimate gradients of the values in the modified training data set by mapping the values in the modified training data set to corresponding values in the training data set.

In some aspects, the techniques described herein relate to an automotive radar system, wherein the Gaussian noise values are determined by a finite number of noise levels.

In some aspects, the techniques described herein relate to an automotive radar system, wherein the Gaussian noise values are determined according to a diffusion process, wherein the diffusion process is defined using a stochastic differential equation.

In some aspects, the techniques described herein relate to an automotive radar system, wherein the received signal includes a signal encoded as a frequency-modulated continuous wave radar signal.

In some aspects, the techniques described herein relate to a system, including: a transmitter configured to transmit a radar signal towards a target object; a receiver configured to receive a received signal in response to the transmitted radar signal; and a processor, configured to: receive, using the receiver, a received signal, execute an iterative procedure using a desired signal prior and an interference signal prior and to determine an estimate of an interference signal component of the received signal and an estimate of the desired signal component of the received signal, wherein the interference signal prior is determined using generative modeling and each iteration of the iterative procedure executes a data consistency operation, use the estimate of the interference signal component and the received signal to determine a desired signal, and processing the desired signal to determine an attribute of the target object.

In some aspects, the techniques described herein relate to a system, wherein the desired signal prior is a sparse prior.

In some aspects, the techniques described herein relate to a system, wherein the interference signal prior is determined by performing denoising score matching on a training data set, wherein the training data set includes at least one of simulated time-domain interference signals and measured time-domain interference signals.

In some aspects, the techniques described herein relate to a system, wherein values in the training data set are modified by adding Gaussian noise values to the values in the training data set to generate a modified training data set, wherein Gaussian noise values added to the values in the training data set have a range of standard deviations.

In some aspects, the techniques described herein relate to a system, wherein the generative modeling is configured to estimate gradients of the values in the modified training data set by mapping the values in the modified training data set to corresponding values in the training data set.

In some aspects, the techniques described herein relate to a system, wherein the Gaussian noise values are determined by a finite number of noise levels.

In some aspects, the techniques described herein relate to a system, wherein the Gaussian noise values are determined according to a diffusion process, wherein the diffusion process is defined using a stochastic differential equation.

In some aspects, the techniques described herein relate to a system, wherein the received signal includes a signal encoded as a frequency-modulated continuous wave radar signal.

In some aspects, the techniques described herein relate to a method, including: receiving a received signal y, wherein the received signal y is of the form $y=x_s+x_i+n$, wherein $x_s$ represents a desired signal component, $x_i$ represents an interference signal component, and n represents a noise component of the received signal y; determining a desired signal prior $p_{\theta 1}$, wherein the desired signal prior $p_{\theta 1}$ is determined using a generative network; determining an interference signal prior $p_{\theta 2}$, wherein the interference signal prior $p_{\theta 2}$ is determined using generative modeling, executing an iterative procedure using the desired signal prior $p_{\theta 1}$ and the interference signal prior $p_{\theta 2}$ and to determine an estimate of the interference signal component $x_i$ and an estimate of the desired signal component $x_s$, wherein each iteration of the iterative procedure executes a data consistency operation to increase a data consistency attribute between the estimate of the interference signal component $x_i$ and the estimate of the desired signal component $x_s$, determining a desired signal using the estimate of desired signal component $x_s$, and processing the desired signal to determine an attribute of a target object in a field of vision of an automotive radar system.

In some aspects, the techniques described herein relate to a method, wherein determining the desired signal further includes subtracting the estimate of the interference signal component $x_i$ from the received signal y to determine the desired signal.

In some aspects, the techniques described herein relate to a method, further including determining the interference signal prior $p_{\theta 2}$ by performing denoising score matching on a training data set, wherein the training data set includes at least one of simulated time-domain interference signals and measured time-domain interference signals.

In some aspects, the techniques described herein relate to a method, further including modifying values in the training data set by adding Gaussian noise values to the values in the training data set to generate a modified training data set.

Although the examples have been described with reference to automotive radar systems, the systems and methods described herein may be implemented in conjunction with other types of radar systems.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first," "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An automotive radar system comprising:
at least one transmitter and at least one receiver, wherein the at least one transmitter and the at least one receiver are configured to transmit and receive radar signals, wherein the at least one transmitter and the at least one receiver are coupled to a vehicle; and
an automotive radar processor configured to:
cause the at least one transmitter to transmit, at a first time, a first radar signal,
receive, using the at least one receiver, a received signal y, wherein the received signal y is of the form $y = x_s + x_i + n$, wherein $x_s$ represents a desired signal component, $x_i$ represents an interference signal component, and n represents a noise component of the received signal y,
determine a desired signal prior $p_{\theta 1}$, wherein the desired signal prior $p_{\theta 1}$ defines a first data distribution expected in the desired signal component $x_i$ of the received signal y and is determined using generative modeling,
determine an interference signal prior $p_{\theta 2}$, wherein the interference signal prior $p_{\theta 2}$ defines a second data distribution expected in the interference signal component and is determined using generative modeling,
execute an iterative procedure using the desired signal prior $p_{\theta 1}$ and the interference signal prior $p_{\theta 2}$ and to determine an estimate of the interference signal component $x_i$ and an estimate of the desired signal component $x_i$, wherein each iteration of the iterative procedure comprises a data consistency operation to increase a data consistency attribute between the received signal y, the estimate of the interference signal component $x_i$, and the estimate of the desired signal component $x_s$, and
determine a desired signal using the estimate of desired signal component $x_s$, and
process the desired signal to determine an attribute of a target object in a field of vision of the automotive radar system.

2. The automotive radar system of claim 1, wherein the automotive radar processor is configured to determine the desired signal by subtracting the estimate of the interference signal component $x_i$ from the received signal y to determine the desired signal.

3. The automotive radar system of claim 1, wherein the interference signal prior $p_{\theta 2}$ is determined by performing denoising score matching on a training data set, wherein the training data set includes simulated time-domain interference signals.

4. The automotive radar system of claim 3, wherein values in the training data set are modified by adding Gaussian noise values to the values in the training data set to generate a modified training data set, wherein Gaussian noise values added to the values in the training data set have a range of standard deviations.

5. The automotive radar system of claim 4, wherein the generative modeling is configured to estimate gradients of the values in the modified training data set by mapping the values in the modified training data set to corresponding values in the training data set.

6. The automotive radar system of claim 4, wherein the Gaussian noise values are determined by a finite number of noise levels.

7. The automotive radar system of claim 4, wherein the Gaussian noise values are determined according to a diffusion process, wherein the diffusion process is defined using a stochastic differential equation.

8. The automotive radar system of claim 1, wherein the received signal includes a signal encoded as a frequency-modulated continuous wave radar signal.

9. A system comprising:
a transmitter configured to transmit a radar signal towards a target object;
a receiver configured to receive a received signal in response to the transmitted radar signal; and
a processor, configured to:
receive, using the receiver, a received signal,
execute an iterative procedure using a desired signal prior including a first data distribution expected in a desired signal component of the received signal and an interference signal prior including a second data distribution expected in an the interference signal component of the received signal and to determine an estimate of an interference signal component of the received signal and an estimate of the desired signal component of the received signal, wherein the interference signal prior is determined using generative modeling and each iteration of the iterative procedure executes a data consistency operation,
use the estimate of the interference signal component and the received signal to determine a desired signal, and
processing the desired signal to determine an attribute of the target object.

10. The system of claim 9, wherein the desired signal prior is a sparse prior.

11. The system of claim 9, wherein the interference signal prior is determined by performing denoising score matching on a training data set, wherein the training data set includes at least one of simulated time-domain interference signals and measured time-domain interference signals.

12. The system of claim 11, wherein values in the training data set are modified by adding Gaussian noise values to the values in the training data set to generate a modified training data set, wherein Gaussian noise values added to the values in the training data set have a range of standard deviations.

13. The system of claim 12, wherein the generative modeling is configured to estimate gradients of the values in the modified training data set by mapping the values in the modified training data set to corresponding values in the training data set.

14. The system of claim 12, wherein the Gaussian noise values are determined by a finite number of noise levels.

15. The system of claim 12, wherein the Gaussian noise values are determined according to a diffusion process, wherein the diffusion process is defined using a stochastic differential equation.

16. The system of claim 9, wherein the received signal includes a signal encoded as a frequency-modulated continuous wave radar signal.

17. A method comprising:

receiving a received signal y, wherein the received signal y is of the form $y=x_s+x_i+n$, wherein $x_s$ represents a desired signal component, $x_i$ represents an interference signal component, and n represents a noise component of the received signal y;

determining a desired signal prior $p_{\theta 1}$, wherein the desired signal prior $p_{\theta 1}$ defines a first data distribution expected in the desired signal component $x_i$ of the received signal y and is determined using a generative network;

determining an interference signal prior $p_{\theta 2}$, wherein the interference signal prior $p_{\theta 2}$ defines a second data distribution expected in the interference signal component and is determined using generative modeling, executing an iterative procedure using the desired signal prior poi and the interference signal prior $p_{\theta 2}$ and to determine an estimate of the interference signal component $x_i$ and an estimate of the desired signal component $x_s$, wherein each iteration of the iterative procedure executes a data consistency operation to increase a data consistency attribute between the estimate of the interference signal component $x_i$ and the estimate of the desired signal component $x_s$, determining a desired signal using the estimate of desired signal component $x_s$, and processing the desired signal to determine an attribute of a target object in a field of vision of an automotive radar system.

18. The method of claim 17, wherein determining the desired signal further comprises subtracting the estimate of the interference signal component $x_i$ from the received signal y to determine the desired signal.

19. The method of claim 17, further comprising determining the interference signal prior $p_{\theta 2}$ by performing denoising score matching on a training data set, wherein the training data set includes at least one of simulated time-domain interference signals and measured time-domain interference signals.

20. The method of claim 19, further comprising modifying values in the training data set by adding Gaussian noise values to the values in the training data set to generate a modified training data set.

* * * * *